United States Patent [19]
Rudell et al.

[11] Patent Number: 5,366,402
[45] Date of Patent: Nov. 22, 1994

[54] TOY BUBBLE MACHINE

[75] Inventors: Elliot Rudell, 1619 Gramercy Ave., Torrance, Calif. 90501; George T. Foster, Signal Hill; Alan R. Pitkanen, Manhattan Beach, both of Calif.

[73] Assignee: Elliot A. Rudell, Torrance, Calif.

[21] Appl. No.: 980,537

[22] Filed: Nov. 23, 1992

[51] Int. Cl.$^5$ .................. A63H 33/28; A63H 5/00; A47B 96/06
[52] U.S. Cl. .................. 446/16; 446/397; 446/409; 248/223.4; 248/544
[58] Field of Search .................. 446/16, 15, 17, 18, 446/19, 20, 21, 397, 404, 408, 409, 440; 248/223.4, 224.4, 222.4, 221.4, 544, 546

[56] References Cited

U.S. PATENT DOCUMENTS

| | | | |
|---|---|---|---|
| 1,013,551 | 1/1912 | Horton | 246/222.4 X |
| 2,805,515 | 9/1957 | Gans et al. | 446/16 |
| 3,246,418 | 4/1966 | Andersen et al. | 446/16 |
| 3,288,414 | 11/1966 | Fortunato | 248/221.4 |
| 3,738,051 | 6/1973 | Vakeem | 446/21 |
| 3,913,260 | 10/1975 | Corbett | 446/16 |
| 4,045,049 | 8/1977 | Schultz | 446/16 X |
| 4,062,143 | 12/1977 | Lerman | 446/16 |
| 4,300,745 | 11/1981 | Peterson | 248/546 |
| 4,447,982 | 5/1984 | Gusher | 446/16 |
| 4,556,392 | 12/1985 | Chang | 446/16 |

FOREIGN PATENT DOCUMENTS

| | | | |
|---|---|---|---|
| 0094532 | 11/1983 | European Pat. Off. | 446/16 |
| 614815 | 6/1935 | Germany | 446/35.4 |

Primary Examiner—Robert A. Hafer
Assistant Examiner—D. Neal Muir
Attorney, Agent, or Firm—Blakely, Sokoloff, Taylor & Zafman

[57] ABSTRACT

A toy assembly that has a bubble generating machine which can be coupled to a variety of existing bicycles and tricycles. The bubble machine includes a housing which contains a pair of rings that can move in and out of a reservoir filled with bubble liquid. The rings move adjacent to a fan which blows air through the rings to create a plurality of bubbles. Both the rings and the fan are coupled to an electric motor which can be energized by depressing a button The button is also connected to an electronic assembly which emits sounds when the button is depressed. The button is typically located on the bike, so that the child can generate bubbles and noises while driving the vehicle. The assembly also includes a bracket which can be attached to the frame of a vehicle with either a pair of straps, or a pair of screws. The bracket is constructed to be attached to bikes having either tubular or rectangular frames. Extending from the bracket is an adjustable wire that couples the bubble machine to the bike.

9 Claims, 3 Drawing Sheets

TOY BUBBLE MACHINE

BACKGROUND OF THE INVENTION

1. Field of the Invention

The present invention relates to a toy device that generates bubbles and noise, and which can be retrofitted onto existing bicycles and tricycles.

2. Description of Related Art

Some children's bicycles and tricycles contain accessories such as horns or bells, which can be operated by the driver while operating the vehicle. The accessories can increase the pleasure derived from the bike. Mattel Inc., had sold a sound generating device under the trademark V-RROOM which could be attached to existing bicycles. The housing of the Mattel device was constructed to simulate an automobile engine and contained mechanical noise generating means for reproducing a single roaring sound of an engine. The V-RROOM was typically attached to a bicycle by a pair of steel brackets that extended around the frame of the bike. The Mattel brackets could only be attached to tricycles or bicycles with tubular frames, thereby limiting the use of the product.

Fisher-Price Toys produced a tricycle, and a toy lawnmower, which could create bubbles as the vehicle was moved by the child. The tricycle included a bubble blowing mechanism which was integrally molded with the bike. The bubble mechanism could not be retrofitted onto existing bicycles and thus a child who wanted a bubble blowing bike would have to purchase the entire Fisher-Price product. Additionally, the bubble blowing mechanism required airflow to separate the bubble liquid from a ring which created the bubbles. The airflow was typically provided by moving the tricycle. To effectively operate the bubble mechanism, the speed of the tricycle would have to be moved fast enough to create an airflow which would separate the bubble liquid from the ring. The Fisher-Price product therefore required the child to peddle the vehicle at a speed great enough to initiate the formation of bubbles.

It would be desirable to provide a bubble mechanism which can be retrofitted onto a variety of existing bicycles and tricycles. It would also be desirable to provide a bubble mechanism which can be operated without manually inducing airflow through the bubble machine. It would also be desirable to provide an engine style bubble blowing mechanism which allowed a child to select from a number of automobile sounds.

SUMMARY OF THE INVENTION

The present invention is a toy assembly that has a bubble generating machine which can be coupled to a variety of existing bicycles and tricycles. The bubble machine includes a housing which contains a pair of rings that can move in and out of a reservoir filled with bubble liquid. The rings move adjacent to a fan which blows air through the rings to create a plurality of bubbles. Both the rings and the fan are coupled to an electric motor which can be energized by depressing a button. The button is also connected to an electronic assembly which emits sounds when the button is depressed. The button is typically located on the bike, so that the child can generate bubbles and noises while driving the vehicle.

The assembly also includes a bracket which can be attached to the frame of a vehicle with either a pair of straps, or a pair of screws. The bracket is constructed to be attached to bikes having either tubular or rectangular frames. Extending from the bracket is a wire that couples the bubble machine to the bike. The wire is adapted to bend relative to the bracket, so that the user can adjust the bubble machine relative to the bike. The bendable wire allows the user to rotate the bubble machine, so that the fluid filled reservoir within the housing is horizontal with the riding surface of the vehicle. The horizontal relationship of the reservoir reduces the possibility of the liquid spilling from the machine during operation of the vehicle.

Therefore it is an object of the present invention to provide a bubble generating machine which can be retrofitted onto a variety of existing bicycles or tricycles.

It is also an object of the present invention to provide a bubble generating machine which can be operated without manually inducing an airflow through the machine.

BRIEF DESCRIPTION OF THE DRAWING

The objects and advantages of the present invention will become more readily apparent to those ordinarily skilled in the art after reviewing the following detailed description and accompanying drawings, wherein.

DETAILED DESCRIPTION OF THE INVENTION

Figure 1:
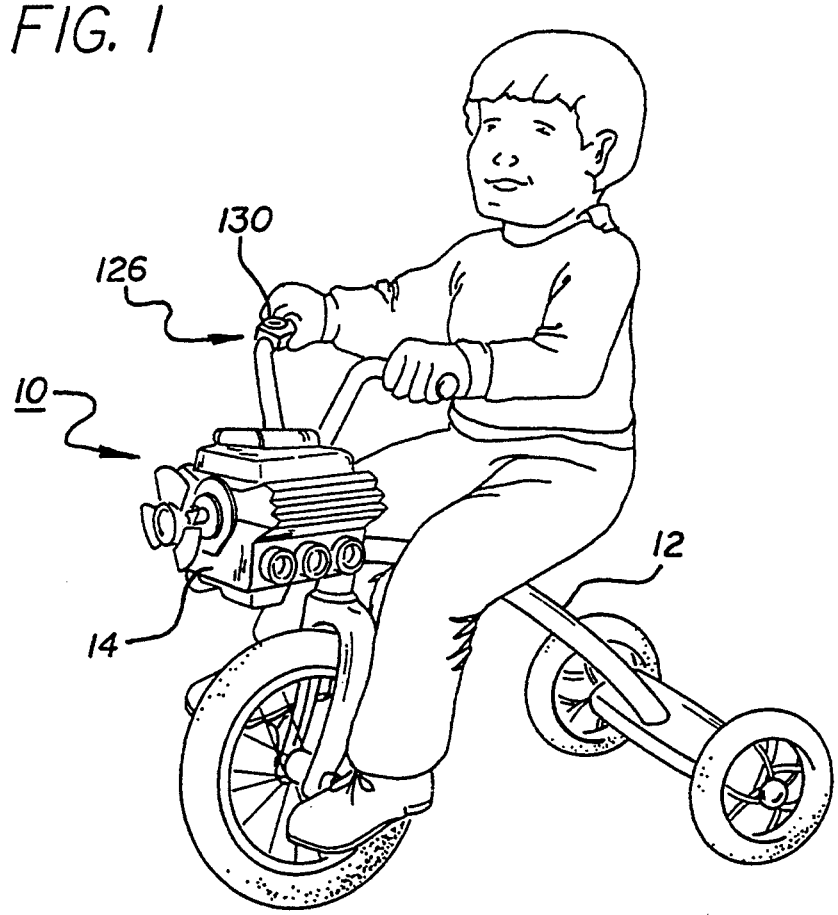
FIG. 1 is a perspective view of a toy assembly of the present invention attached to tricycle.

Referring to the drawings more particularly by reference numbers, FIG. 1 shows a toy assembly 10 of the present invention attached to a tricycle 12. The assembly 10 has a bubble generating machine 14 which is attached to the tricycle 12 by a bracket assembly 16. Although a tricycle is described and shown, it is to be understood that the toy assembly 10 can be attached to other vehicles such as a bicycle. The bracket assembly 16 of the present invention is constructed to retrofit the bubble machine 14 onto a variety of existing bicycles and tricycles, so that children can add a bubble machine 14 to their bikes.

Figure 2:
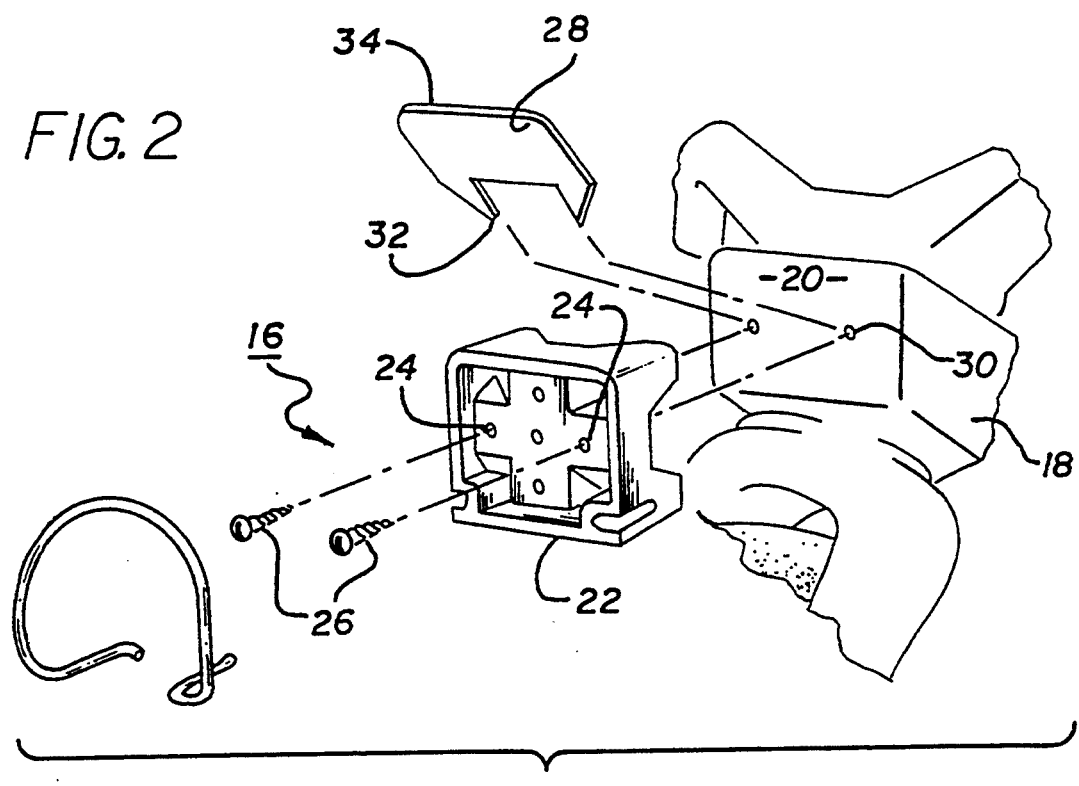
FIG. 2 is a an exploded view of a bracket assembly used to couple a bubble machine to a tricycle.

FIG. 2 shows an embodiment of the bracket assembly 16 that can be attached to a tricycle frame 18 which has a flat surface 20. The assembly 16 includes a bracket 22 that has a plurality of holes 24. The holes 24 provide clearance for a pair of screws 26 which can be screwed into the frame 18. To facilitate installation, the assembly may include a tool 28 which can be used to create a pair of pilot holes 30 for the screws 26. The pilot holes 30 can be created by placing the tips 32 of the tool 28 adjacent to the frame 18 and striking the base 34 of the tool 28 with a hammer or similar instrument.

Figure 3:
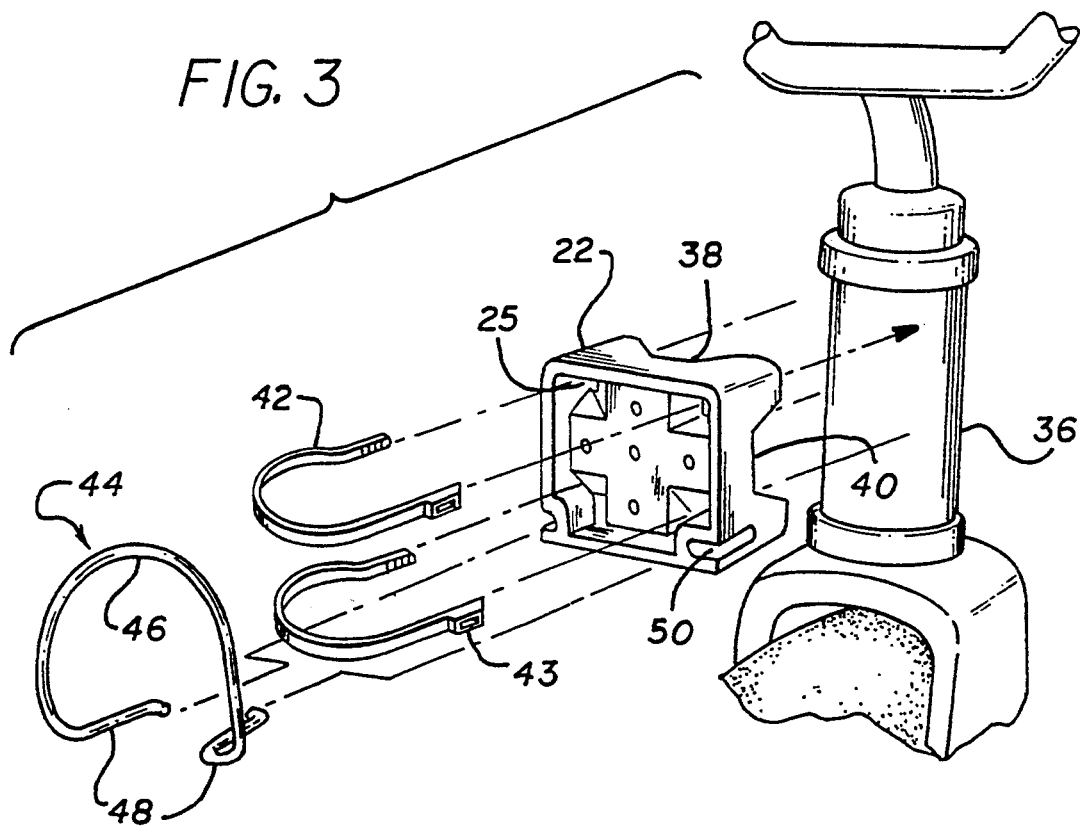
FIG. 3 is an exploded view of a bracket that can be attached to a tubular bicycle frame by a pair of straps.

As shown in FIG. 3, the bracket 22 can also be attached to a bike having a tubular frame 36. The bracket 22 has a vertical groove 38 which allows the bracket 22 to more readily conform to the cylindrical shape of the frame 36. The bracket 22 may also have a horizontal groove 40 which can provide clearance for vehicles 12 with corresponding protruding members. The bracket 22 is typically attached to the tubular frame 36 by one or more plastic straps 42 which extend through the slots 25 and wrap around the frame 36. The straps 42 have integral buckles 43 which secure the ends of the straps and attach the bracket 22 to the bike 12.

Figure 4:
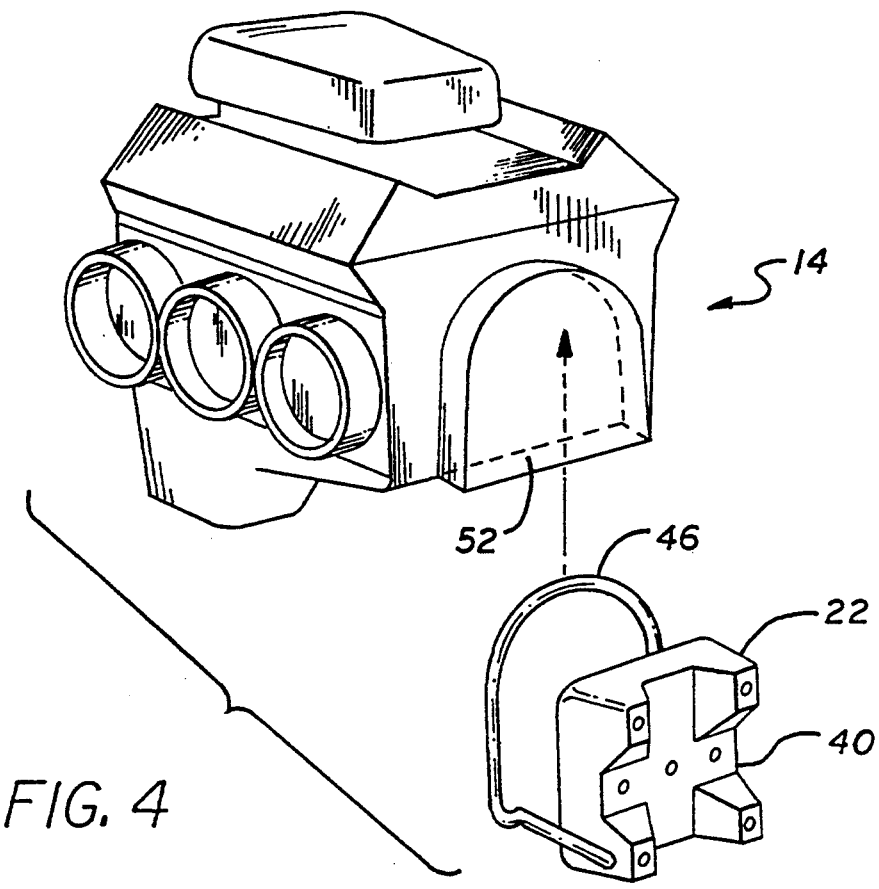
FIG. 4 is a rear perspective view of a bubble machine which has a slot adapted to receive a wire that extends from the bracket assembly.

The bracket assembly 16 has a wire 44 that is typically bent to have an arcuate portion 46 and a pair of end portions 48. The wire 44 is attached to the bracket 22 by inserting the end portions 48 into a pair of slots 50. As shown in FIG. 4, the arcuate portion 46 is inserted into a slot 52 in the bubbling machine 14, to couple the machine 14 to the bike 12. The wire 44 is held in place by friction and is adapted to move relative to the bracket 22, so that the bubble machine 14 can be rotated relative to the bike 12. The movement of the wire 44 allows the user to rotate the bubble machine 14, so that the fluid reservoir of the machine is essentially parallel with the riding surface of the vehicle 12. Keeping the reservoir parallel with the riding surface reduces the possibility of spilling the liquid out of the machine. The movable wire 44 is particularly useful when the machine 14 is attached to a bike frame that is not perpendicular to the riding surface.

Figure 5:
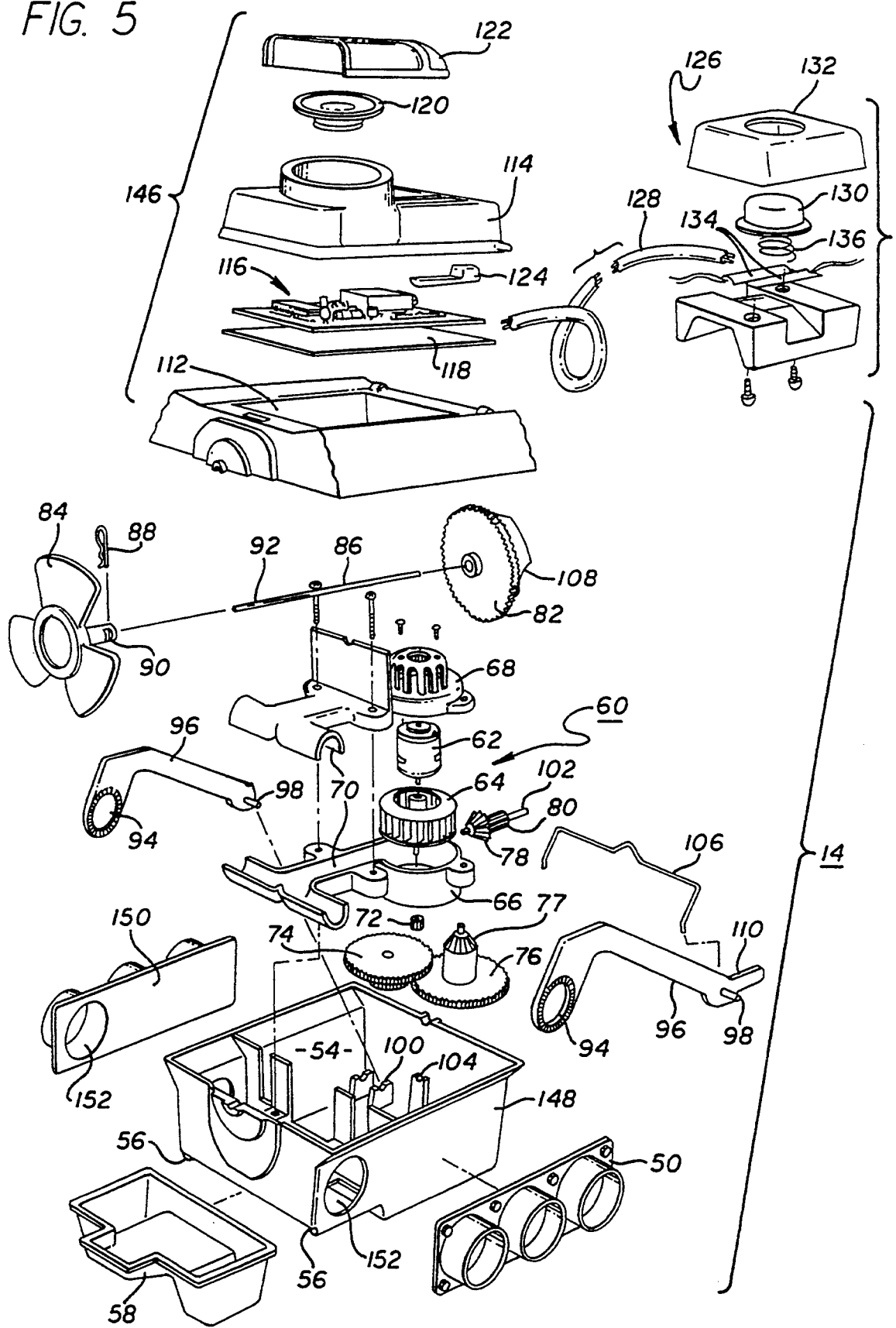
FIG. 5 is an exploded view of the bubble machine.

As shown in FIG. 5, the bubble machine 14 includes a top housing 46 which can be attached to a bottom housing 148. Attached to the bottom housing 148 are a pair of exhaust plates 150 that are preferably constructed to simulate the exhaust manifold of an automobile engine. Both the bottom housing 148 and exhaust plates 150 have openings 152 that provide fluid communication to an inner cavity 54 formed by the housing 148. The bottom housing 148 also has a pair of channels 56 formed therein. The channels 56 are adapted to receive a reservoir 58 that can slide in and out of the housing 148. The reservoir 58 is typically filled with a bubble liquid which is used to generate bubbles.

The bubble machine 14 also contains a motor/fan assembly 60. The assembly 60 includes an electric motor 62 which rotates a fan 64 located within a lower duct housing 66. The fan 64 and motor 62 are encapsulated by an upper duct housing 68. The duct housings 66 and 68 create a pair of ducts 70. When the motor 62 is energized the fan 64 is rotated so that air flows out of the ducts 70.

The fan 64 and motor 62 are also coupled to a pinion gear 72 which drives a reduction gear 74. The reduction gear 74 rotates a first linkage gear 76. The first linkage gear 76 has a conical gear section 77 which drives a second linkage gear 78. The second linkage gear 78 has a pinion section 80 which rotates a fan gear 82. The fan gear 82 is coupled to a propeller 84 by a shaft 86. The propeller 84 typically extends from the housing and is constructed to simulate the fan of an automobile. The diameter of the shaft 86 and the coupling bore of the propeller 84 are typically constructed, so that the two members can move relative to each other when an external force is applied to the propeller 84. For example, if a child touches or holds the propeller 84 when the motor 62 is energized, the propeller 84 will remain stationary while the shaft 86 and gears continue to rotate. Such a construction insures that the propeller 84 does not injure the child. The shaft 86 is typically held in place by a clip 88 that extends through slots 90 in the propeller 84 and into grooves 92 in the shaft 86.

The machine 14 has a pair of rings 94 that are integrally formed into a pair of arms 96. Each arm 96 is pivotally mounted to the lower housing 148 by a pair of pins 98 that are located within a pair of grooves 100 in the housing 148. Likewise, the shaft 102 of the second linkage gear 78 is also mounted to a gear groove 104 in the housing 148. Attached to the arms 96 is a coupling wire 106 which rest on the top of a cam 108 that extends from the fan gear 82. Rotation of the fan gear 82 and cam 108, moves the wire 106 and arms 96 relative to the housing 148.

The motor 62 and cam 108 rotate the arms 96 between a down position and an up position. When the arms 96 are in the down position, the rings 94 are submerged in the bubble liquid of the reservoir 58. When the arms 96 are rotated into the up position, the rings 94 are pulled out of the reservoir 58. Bubble liquid typically has a relatively high viscosity, so that a layer of liquid covers the inner opening of the rings 94 when the arms 96 are rotated into the up position. When in the up position, the rings 94 are located adjacent to the ducts 70, such that the fan 64 blows air through the rings 94 and creates bubbles. One of the arms 96 has a lever 110 that extends from the housing 148 and allows the user to manually rotate the arms 96 into the up position. Manual rotation of the arms 96 may be required to remove the reservoir 58, if the arms 96 are in the down position when the motor 62 is deenergized.

The top housing 146 has a battery chamber 112 adapted to contain a number of batteries (not shown). The batteries are covered by a battery door 114 that is connected to the top housing 146. Located within the battery door 114 is an electronic assembly 116 that is mounted to a cover plate 118. The electronic assembly 116 is connected to a speaker 120 located within the battery door 114 and covered by a speaker housing 122. The electronic assembly 116 typically contains integrated circuits and other electrical components which together with the speaker 120 can generate sound. Mounted to the assembly 116 is a switch 124 which can be moved by the user to one of a number of positions. The electronic assembly 116 is constructed so that a different sound is generated for each switch 124 position. For example, the assembly 116 may generate sounds that simulate a motor or a siren. Both the motor 62 and the electronic assembly 116 are connected to the batteries within the top housing 146.

The bubble machine 14 also has a button assembly 126 that is coupled to the batteries within the housing 146 by a pair of wires 128. The assembly 126 has a button 130 located within a housing 132, typically constructed from two separate pieces. The assembly 126 also contains a pair of contact plates 134 that function as an electrical switch for the motor 62 and electronic assembly 116. The switch can be closed by depressing the button 130. The assembly 126 contains a spring 136 which opens the switch when the button 130 is released. When the button 130 is depressed and the switch is closed, power is supplied from the batteries to the motor 62 and electronic assembly 116. Activating the motor 62 and assembly 116 generates bubbles and sound. As shown in FIG. 1, the button assembly 126 is typically attached to the handle bars of the tricycle 12, so that the child can easily depress the button 130. The present invention therefore provides an assembly which allows a bubble machine to be retrofitted onto an existing bicycle or tricycle, and allows the user to easily create bubbles and noise as the child is peddling the vehicle.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A toy assembly that can be attached to a vehicle, comprising:

a housing;

a reservoir filled with a bubble fluid;

a ring adapted to move between a down position and an up position, said ring being within said reservoir in the down position and out of said reservoir in the up position, wherein said ring can retain a film of bubble film when moving from the down position to the up position;

a fan adapted to direct air through said ring when said ring is in the up position such that there is created a bubble;

a motor operatively connected to said fan and said ring to rotate said fan and move said ring between the up and down positions;

a propeller that extends from said housing and is operatively connected to said motor; and a clutch coupled to said propeller to allow said propeller to remain stationary when said motor is energized.

2. The toy assembly as recited in claim 1, further comprising bracket means for attaching said housing to the vehicle.

3. The toy assembly as recited in claim 1, wherein said bracket means includes a bracket adapted to be attached to the vehicle and a wire adapted to couple said housing to said bracket.

4. The toy assembly as recited in claim 3, wherein said wire is adapted to move relative to said bracket.

5. The toy assembly as recited in claim 3, wherein said bracket has a vertical groove adapted to receive a cylindrical portion of the vehicle.

6. The toy assembly as recited in claim 5, wherein said bracket is attached to the vehicle by a strap that wraps around a portion of the vehicle.

7. The toy assembly as recited in claim 3, wherein said bracket is attached to the vehicle by a pair of screws.

8. The toy assembly as recited in claim 7, further comprising a tooling plate which has a pair of tips which can create holes in the vehicle.

9. The toy assembly as recited in claim 1, further comprising sound means attached to said housing for generating sound.

* * * * *